Oct. 6, 1970  E. H. AUGUSTIN ETAL  3,532,259

METHOD OF CUTTING GLASS

Filed May 22, 1968

EUGENE H. AUGUSTIN
GEORGE J. PAGAN
INVENTORS

BY John R. Faulkner
William E. Johnson

ATTORNEYS

United States Patent Office 3,532,259
Patented Oct. 6, 1970

3,532,259
METHOD OF CUTTING GLASS
Eugene H. Augustin, Dearborn Heights, and George J. Pagan, Dearborn, Mich., assignors to Ford Motor Company, Dearborn, Mich., a corporation of Delaware
Filed May 22, 1968, Ser. No. 731,235
Int. Cl. B26f 3/00
U.S. Cl. 225—2                                    6 Claims

ABSTRACT OF THE DISCLOSURE

A method of cutting a glass template from a glass bracket and thereafter of stripping the template from edge trim has the following steps. A glass bracket is loaded onto an indexable, endless belt of yieldable material. The bracket is advanced on the belt to a glass scoring station at which the bracket is scored by suitable scoring apparatus to define the glass template shape therein. The scored glass bracket is advanced to a stripping station at which pressure is applied at spaced points along the score on the glass bracket to complete the cutting of the glass template from the edge trim. The glass template is lifted upwardly from the belt while the edge trim on the belt is advanced to a disposal station. The glass template is moved to an unloading station.

---

At the present time the cutting of a glass template from a glass bracket, for example an automotive windshield from a rectangular glass bracket, is accomplished by a combination of semi-automatic and manual operations. More particularly, an operator manually positions individual rectangular glass brackets in a glass scoring machine. The glass scoring machine is actuated and it scores the surface of the glass bracket in a prescribed configuration to define the template shape. Thereafter, the glass bracket is manually scored outside of the glass template and the bracket is removed from the glass scoring machine by operators who grasp opposite ends of the bracket. The operators flex the edge trim, that is, that portion of the glass outside of the template shape, and the flexing of the glass causes the fissures produced by the original score to run through the glass and thereby complete the cutting of the glass. The flexing of the glass also permits the separation of the edge trim from the glass template and the edge trim is manually discarded to a disposal device. The windshield template is then placed on a conveyor for subsequent processing.

This combination of semi-automatic and manual operations of cutting glass templates from glass brackets is, of course, expensive because of the amount of manual operation employed. The combined operation also produces scrap material if the operators are not careful in placing the score marks which permit the removal of the edge trim outside the area of the glass template. Improper location of the operator's score mark permits the score to be run into the glass template itself thereby destroying it for further utilization. Also, if the two operators do no flex the glass at nearly a simultaneous point in time, stresses can be set up in the glass which cause a running of the score into the glass template thereby destroying it for subsequent use.

The method of this invention makes fully automatic the cutting of a glass bracket to a glass shape and the subsequent stripping of the template from the bracket. The method reduces the labor cost involved in obtaining a glass template from a glass bracket.

The method of this invention is also directed to a process of cutting glass which permits the cutting of a glass template from a glass bracket and the subsequent separation of the bracket from the edge trim without the necessity of applying a flexing pressure on the edge trim which can cause damage to the glass template. In this regard, the method of this invention reduces the amount of scrappage of glass which is occasioned in the combined manual-semi-automatic operation.

SUMMARY OF THE INVENTION

This invention relates to a method of cutting glass and, more particularly, to a method of cutting a glass template from a glass bracket and of subsequently stripping the template from the bracket.

The glass cutting method of this invention generally has at least the following steps. A glass bracket is scored on one surface thereof along a pattern to define an article, or glass template, to be cut from the glass bracket. The scoring causes fissures in the glass which do not go completely through the thickness of the glass. During or after the scoring operation, the glass bracket is positioned on a supporting medium in such a position that at least portions of the unscored surface of the bracket engage the supporting medium. Pressure is applied across the score simultaneously at a plurality of spaced points along the score which overlie the supporting medium. The pressure applied at each point acts in a direction toward the supporting medium thereby to place the unscored surface of the glass bracket below the score in tension. This causes the fissures originally formed in the glass by the scoring operation to be run completely through the thickness of the glass to complete the cutting of the glass along the pattern thereon.

In greater detail, the supporting medium may be an endless belt. In such a case the glass bracket is loaded on the belt at a loading station and it is then advanced to a scoring station. After the scoring of the glass bracket, the bracket is advanced on the belt to a stripping station at which pressure is applied at spaced points along the score to cut the glass template from the glass bracket. The glass template is thereafter lifted upwardly from the belt and from the edge trim which remains on the belt. The edge trim is advanced on the belt to a glass disposal station and the glass template is advanced to an unloading station for subsequent processing thereof.

DESCRIPTION OF THE PREFERRED EMBODIMENT

The overall description of the detailed method of this invention includes both the cutting and the stripping of a glass template from a glass bracket. This detailed method will be described in conjunction with FIG. 1 and 2 of the drawings. However, the apparatus shown in FIG. 1 and 2 employs therein the broader method of this invention directed only to the new and novel method of cutting a glass template from a glass bracket.

Figure 1:
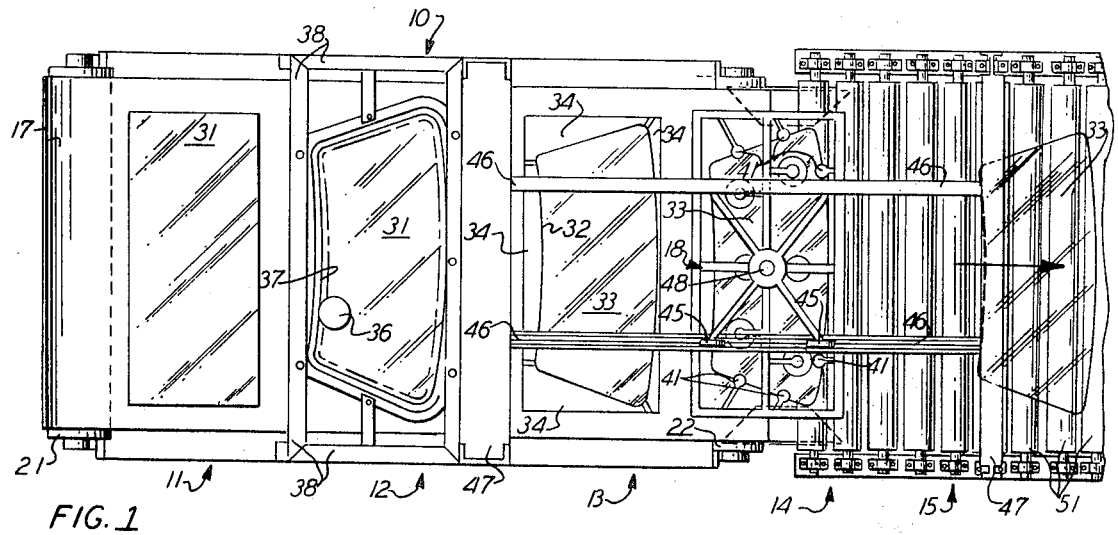
FIG. 1 is a plan view of apparatus capable of performing the method of this invention in which a glass template is cut and stripped from a glass bracket.
Figure 2:
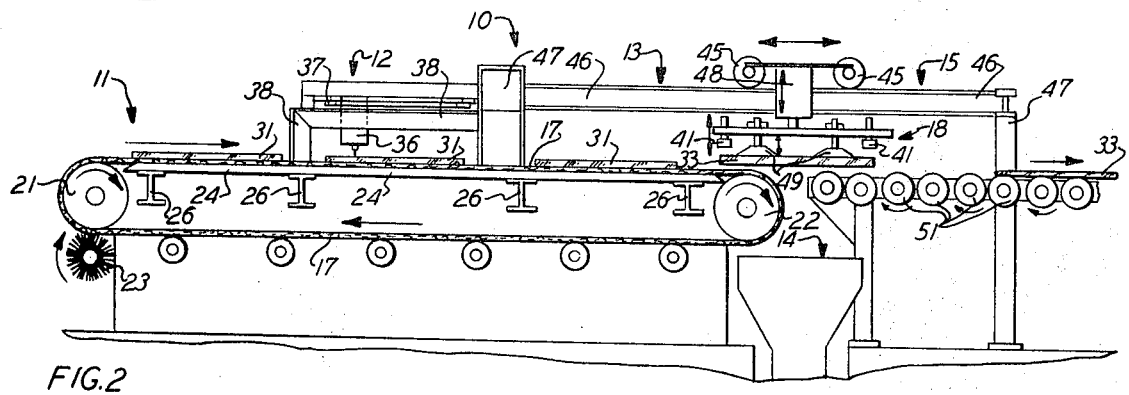
FIG. 2 is an elevation view of the apparatus of FIG. 1.

In FIGS. 1 and 2 there is shown a glass cutting and stripping machine, generally designated by the numeral 10. The machine has a glass loading station 11, a glass scoring station 12, a glass stripping station 13, a glass disposal station 14 and a glass template unloading station 15. An endless belt 17 and a stripping and lifting device 18 interconnect the various stations of the machine 10 in a manner which will be described below.

The endless belt 17, which is formed of a yieldable material such as hard rubber, is indexed around a pair of pulleys 21 and 22 by a suitable indexing device (not shown). Disposed adjacent the loading station 11 is a rotary brush 23 which brushes the endless belt 17 so as to remove from the belt any residue glass particles which remain thereon after the belt has moved through the stations.

Upon each index of the belt 17, a portion thereof is presented to the glass loading station 11. At this station and at the next two adjacent stations, the endless belt is supported on a metal plate 24 which, in turn, is supported by structural members 26. At the loading station, a glass bracket 31 is placed on the belt 17 by an operator or by mechanical handling apparatus (not shown).

Index of the belt 17 causes advancement of the glass bracket 31 from the loading station 11 to the glass scoring station 12. At the glass scoring station, a glass scoring tool 36 is actuated and brought into engagement with the upper surface of the glass bracket 31. The glass scoring tool is moved about a tool guide track 37 while the scoring tool is in engagement with the top surface of the bracket. This action places a score 32 (see FIG. 3) on the glass bracket 31 to define a glass template 33, which in this embodiment is a windshield template. The glass scoring tool and the tool guide track are mounted above the endless belt 17 by structural members 38. The tool 36 and track 37 are of standard construction and no further description thereof will be disclosed herein.

The next index of the endless belt 17 moves the now scored bracket 31 to the glass stripping station 13. At this station the glass stripping and lifting device 18 is utilized both to cut the template 33 from the bracket 31 in accordance with the broad principles of this invention and thereafter to strip the template from the edge trim in acordance with the further principles and teachings of this invention.

Figure 3:
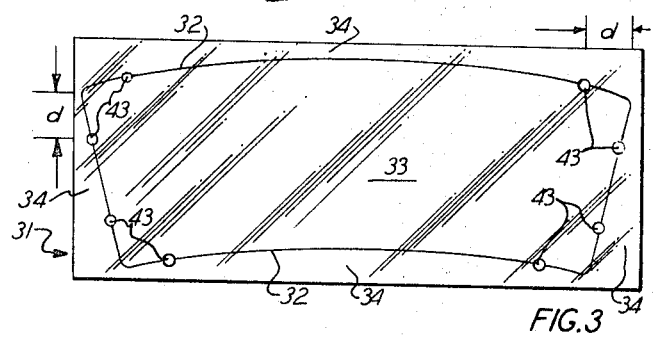
FIG. 3 is a plan view of a glass bracket scored to a glass template shape.
Figure 4:
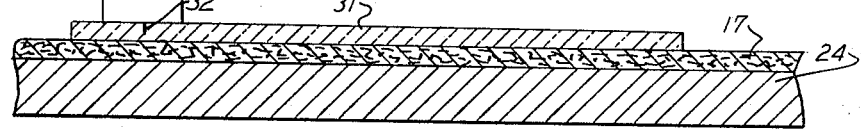
FIG. 4 is a schematic drawing of the manner in which pressure is applied to the score on the glass template in order to cut the template from the bracket.

The new and novel cutting method of this invention is best appreciated by reference to FIG. 3 and 4. In FIG. 3 the glass bracket 31 is shown with the score 32 thereon to define within the score the glass template 33. The score 32, produced by the scoring tool 36 is comprised of fissures in the glass which extend from the scored surface of the glass part way into the interior thickness of the glass bracket 31 but not to the bottom surface thereof. In order to complete the cutting of the glass template 33 from the glass bracket 31, it is necessary to run the fissures in the glass completely to and through the bottom surface of the glass in engagement with the belt 17 of yieldable material.

In order to complete the running of the fissures of the score 32 completely through the glass thickness, a plurality of pressure applying devices, generally designated by the numeral 41, are brought down into engagement with the surfaces of the glass at spaced points along the score 32. In a preferred embodiment, each device 41 (one shown in FIG. 4) has a pressure applying portion 42 thereon formed of a semi-rigid material such as neoprene rubber or heavy felt. The pressure applying portion is 1¼ inches in diameter and it is large enough that it not only overlies the score 32 but also a portion of the glass on either side of the score. Thus, pressure may be applied by the device 41 not only across the score but also a portion of the area of the glass on either side of the score. The pressure applying devices are mounted for vertical movement on the stripping and lifting device 18 and their operation will be described more fully subsequently in this specification.

Application of pressure to the scored upper surface of the glass bracket 31 in a direction generally down toward the endless belt 17 causes the lower, unscored surface of the bracket to be placed in tension. With the lower surface in tension and the upper surface having a pressure applied thereto, the running of the fissures in the glass from the upper surface to the lower surface is completed whereby the cutting of the glass along the score 32 is obtained.

In order to cut the glass windshield template 33 from the glass bracket 31, which in this preferred embodiment has a size range of 56 to 84 inches by 18 to 36 inches and a nominal thickness of ⅛ inch, the cutting pressure is applied by the pressure applying devices 41 at a plurality of points 43 spaced along the score 32. In the glass template 33 there are four or more sharp and curved corners and the points 43 of pressure application are spaced a distance $d$ of approximately 6 inches on each side of the sharpest portion of each of the corners. When pressure is applied at each of the points 43, the fissure defining a particular corner is run approximately half way around that corner by the pressure applied to the pressure point on each side of that corner.

With specific reference now to FIGS. 1 and 2, the completing of the cutting of the glass template 33 from the glass bracket 31 is accomplished at the glass stripping station 13 by utilization of the stripping and lifting device 18. The stripping and lifting device 18 is movable on rollers 45 horizontally along a guide track 46 which is supported by supporting members 47 above the stations 13, 14 and 15. The device is movable vertically by an air actuated cylinder 48 supported by the rollers 45 and controlled by operating means (not shown) of standard construction.

When the stripping and lifting device 18 is moved to its far left position as viewed in FIG. 2, it overlies the glass bracket 31 located in the stripping station 13. The air cylinder 48 is actuated to move the stripping and lifting device 18 thereon downwardly so that the plurality of pressure applying devices 41 supported thereon are initially brought into engagement with the glass template 33 with a force of three to five pounds per square inch at each location. As previously described, the pressure applying devices 41 are brought into engagement with the score 32 at spaced points 43 therealong to cause a complete running of the fissures and a separation of the brackets 33 from edge trim 34. After running of the fissures, the devices 41 are permitted to move upwardly relative to the glass template and the template is then engaged by vacuum cups 49 on the down stroke of the stripping and lifting device 18. Reversal of the air actuated cylinder 48 lifts the glass template 33 upwardly from the edge trim 34 which remains on the belt 17. Upon the next index of the belt 17, the edge trim 34 is discharged into a hopper at the glass disposal station 14.

The glass template 33, which is secured to the stripping and lifting device 18, is transported to the template unloading station 15 by movement of the device 18 to its extreme right position on the guide track 46. Actuation of the air cylinder 48 at the unloading station 15 moves the glass template 33 into engagement with a plurality of rollers 51 at this station and the template is carried away for subsequent processing. Additional glass brackets may be cut to form by repetitious operation of the apparatus in accordance with the method described.

The pressure applying device of the preferred embodiment engaged the glass not only on both sides of the score but also across the score. However, it should be understood that the method of this invention is operative when points of pressure are applied on just the two sides of the score, in which case a greater pressure must be exerted on the glass to run the score. Also, the pressure applying devices may take other forms such as an expandable chamber to which liquid or gas under pressure is supplied.

There has been disclosed herein a method of cutting glass which is simple and efficient in operation and economical to utilize. The invention disclosed will have many modifications which will be apparent to those skilled in the art in view of the teachings of this specification. It is intended that all modifications which fall within the true

What is claimed is:

1. A method of cutting a glass template from a glass bracket, the template having at least one curved section; which method comprises the steps of:

scoring the glass bracket on one surface thereof along a pattern to define a template to be cut from the bracket which template has at least one curved section, the scoring causing fissures in the glass which do not go completely through the thickness of the glass;

positioning the glass bracket on a supporting medium in such a position that at least the portions of the unscored surface of the glass bracket on either side of the sharpest portion of the curved section of the pattern engage the supporting medium; and applying pressure across the score at several points spaced along the length of the score overlying the supporting medium, two of the spaced points at which the pressure is applied across the score being spaced on either side of the sharpest portion of the curved section of the pattern, the pressure applied at each point acting on the score in a direction toward the supporting medium whereby the unscored surface of the glass bracket below the score is placed in tension and the fissures originally formed in the glass by the scoring operation are run completely through the thickness of the glass to complete the cutting of the glass along the pattern thereon.

2. The method of cutting glass as defined in claim 1 wherein the supporting medium is a yieldable material.

3. The method of cutting lass as defined in claim 2 wherein the pattern defined in the glass bracket by the scoring step is of closed configuration with curved or sharp corners therein, and wherein the points at which the pressure is applied across the score are spaced on either side of the sharpest portion of each of the corners of the pattern.

4. A method of cutting a glass template from a glass bracket, the template being of a closed configuration and having at least three corners which comprises:

scoring the glass bracket to the desired glass template shape, the scoring of the glass causing fissures therein which do not go completely through the thickness of the glass;

positioning the scored glass bracket with at least portions of the unscored surface thereof in engagement with a yieldable material; and engaging the glass template with pressure applying devices at points along the score thereon spaced from the corners of the template, the devices applying pressure on either side of the score at each of the points, the application of pressure placing the unscored surface of the glass in tension thereby to complete the running of the fissures from the scored surface through the unscored surface of the glass to complete the cutting of the glass template from the glass bracket.

5. A method of cutting a glass template from a glass bracket and of stripping the template from edge trim which comprises the steps of:

loading a glass bracket onto an indexable, endless belt of yieldable material;

advancing the glass bracket on the belt to a glass scoring station;

scoring the glass bracket at the scoring station to define the glass template shape thereon;

advancing the scored glass bracket on the belt to a stripping station spaced from the scoring station;

applying pressure in a direction toward the belt of yieldable material at spaced points along the score on the glass bracket at the stripping station whereby the glass cutting is completed and the glass template is freed from the glass edge trim;

lifting the glass template upwardly from the belt and from the edge trim which remains on the belt;

moving the glass template to an unloading station; and advancing the edge trim on the belt to a glass disposal station.

6. The method of cutting glass as defined in claim 5 wherein the pressure is applied by the pressure applying devices on both sides and on the score at spaced points along the length of the score, which points are located away from the sharpest portion of the corners of the score.

References Cited

UNITED STATES PATENTS

| 2,286,960 | 6/1942 | Hall | 225—98 |
| 2,291,451 | 7/1942 | Craig | 225—2 |
| 2,559,366 | 7/1951 | Morris | 225—103 |

JAMES M. MEISTER, Primary Examiner

U.S. Cl. X.R.

225—96, 97